US007455252B2

(12) United States Patent
Nara et al.

(10) Patent No.: US 7,455,252 B2
(45) Date of Patent: Nov. 25, 2008

(54) POWDER PARTICLE DISINTEGRATING AND SIZING APPARATUS

(75) Inventors: Yorioki Nara, Ohta-ku (JP); Yoshinori Hanada, Ohta-ku (JP); Kenji Hamada, Ohta-ku (JP); Yoshihiro Wakamatsu, Ohta-ku (JP); Shinichi Yamamoto, Ohta-ku (JP); Yuko Nakahara, Ohta-ku (JP)

(73) Assignee: Nara Machinery Co., Ltd., Tokyo (JP)

( * ) Notice: Subject to any disclaimer, the term of this patent is extended or adjusted under 35 U.S.C. 154(b) by 603 days.

(21) Appl. No.: 10/528,809

(22) PCT Filed: Mar. 25, 2004

(86) PCT No.: PCT/JP2004/004231

§ 371 (c)(1), (2), (4) Date: Oct. 6, 2005

(87) PCT Pub. No.: WO2004/085069

PCT Pub. Date: Oct. 7, 2004

(65) Prior Publication Data

US 2006/0124788 A1 Jun. 15, 2006

(30) Foreign Application Priority Data

Mar. 26, 2003 (JP) ............................ 2003-086292

(51) Int. Cl.

*A47J 19/00* (2006.01)
*B02C 17/02* (2006.01)
*B07B 13/00* (2006.01)

(52) U.S. Cl. .................................. 241/89.3; 241/189.1

(58) Field of Classification Search ............... 241/89.3, 241/189.1, 86

See application file for complete search history.

(56) References Cited

U.S. PATENT DOCUMENTS

| | | | | | |
|---|---|---|---|---|---|
| 2,931,581 | A | * | 4/1960 | Lykken et al. | 241/52 |
| 3,067,959 | A | * | 12/1962 | Kosa et al. | 241/189.1 |
| 3,346,201 | A | * | 10/1967 | Butler, Sr. | 241/189.1 |
| 5,707,016 | A | * | 1/1998 | Witsken | 241/46.06 |

FOREIGN PATENT DOCUMENTS

JP 47-49441 B1 12/1972

(Continued)

*Primary Examiner*—Bena Miller
(74) *Attorney, Agent, or Firm*—Posz Law Group, PLC

(57) ABSTRACT

It is an object of the present invention to provide a particle crushing and sizing apparatus having a sufficiently wide particle crushing and sizing range, capable of being scaled down in size, and having high processing throughput. To achieve the object, a particle crushing and sizing apparatus has, in a casing 1*a*, a horizontally provided drive shaft 2, a plurality of circular plates 10 fixedly supported with intervals at the drive shaft 2, and stators 5 arranged so as to be opposed to plate faces 10*a* at lower peripheral edges of the circular plates 10 and each having inclined faces 5*b* that cause a gap between the plate faces 10*a* of the circular plates 10 to become narrower toward peripheral edges of the plate faces 10*a*. The plate faces 10*a* of the circular plates 10 and the inclined faces 5*b* of the stators 5 form gap portions A where particles are held, and particle crushing and sizing portions B are formed by the peripheral edges of the circular plates 10 and narrowest gap portions between the peripheral edges of the circular plates 10 and the inclined faces of the stators 5.

14 Claims, 10 Drawing Sheets

FOREIGN PATENT DOCUMENTS

| | | | |
|---|---|---|---|
| JP | 56-164034 | | 12/1981 |
| JP | 61-39198 | | 3/1986 |
| JP | 62-44831 | | 3/1987 |
| JP | 2001-149804 | A | 6/2001 |

* cited by examiner ( a )

( b )

POWDER PARTICLE DISINTEGRATING AND SIZING APPARATUS

TECHNICAL FIELD

The present invention relates to a particle crushing and sizing apparatus for sizing into a predetermined particle size various wet or dry materials such as drugs, foodstuffs, fodders, chemicals, fertilizers, powdered coals, limestone, and ceramics materials which are granulated or formed by various apparatuses. More particularly, the present invention relates to a particle crushing and sizing apparatus for crushing wet aggregates or dry blocks, i.e., granulated materials (lumps) granulated or formed by various apparatuses and having particle size equal to or greater than a target value, and for sizing the crushed materials into a certain particle size range.

BACKGROUND ART

Particle mixing, granulating and sizing operations are widely employed in numerous industrial fields, such as in the pharmaceutical and food industries. The control of particle size is an important unit operation for improving particle handling, particle quality, fluidization during fluidized drying, etc.

Thus far, conventional particle crushing and sizing apparatuses regulate particle size using screens. Herein, screens wear off and break down as a result of continued use. Also, worn off powder or broken chips from the screens may contaminate the product particles. In order to avert the above, a strict quality control management is required involving frequent screen checks.

These apparatuses have also problems in that, in the case of wet materials, the screen mesh can become clogged with the processed material, depending on its nature, as it becomes undesirably kneaded in the screen. Also, the impact force of the granulating blades may crush particle having the right size, resulting in an excess of fine powder and thus lower yields.

Therefore, the inventors of the present application developed a particle crushing and sizing apparatus using no screens (Japanese Unexamined Patent Application Publication No. 2000-117131).

The particle crushing and sizing apparatus disclosed in Japanese Unexamined Patent Application Publication No. 2000-117131 is a particle crushing and sizing apparatus for sizing, through a predetermined holding region, wet or dry material granulated or formed by various devices and supplied from a material input port, the apparatus comprising a casing, a rotation body, an opposed face portion opposed to the rotation body at a predetermined distance, and a gap region defined by the rotation body and the opposed face portion which are provided within the casing, the gap region comprising a particle size adjusting region which allows particles suited to the gap setting to pass but does not allow particles not suited to the gap setting to pass, wherein the particles not allowed to pass through the gap region are brought into contact with the opposed face portion in association with rotation of the rotation body at an inlet or face sections of the gap region and are crushed to such an extent that the particles can pass through the gap region and discharged from a discharge port.

Herein, the gap region is composed of the face or the line sections for setting the space between the rotation body and the opposed face portion as the narrowest gap, and the particles are crushed in the narrowest gap or in the vicinity thereof.

Specifically, the rotation body is formed into a substantially conical shape, the casing is formed into a substantially hollow conical shape, the particle holding region is constituted by a casing inner wall and the rotation body, and the narrowest gap is constituted by the lower end peripheral edge of the rotation body and the inner wall of the casing.

However, in the particle crushing and sizing apparatus with the above constitution, the narrowest gap formed by the lower end peripheral edge of the rotation body, formed into a substantially conical shape, and the inner wall of the casing, formed into a substantially hollow conical shape, has a linear shape in the form of a circumference, for which reason the crushing and sizing range is relatively restricted.

Enlarging the lower diameter of the rotating body can broaden the above crushing and sizing range, but at the cost of a larger apparatus size.

Thus, an object of the present invention is to provide a particle crushing and sizing apparatus having a sufficiently large crushing and sizing range.

DISCLOSURE OF THE INVENTION

In order to solve the above problems, the present invention provides a particle crushing and sizing apparatus, comprising in a casing: a drive shaft provided horizontally; a plurality of circular plates fixedly supported at intervals by the drive shaft; and stators provided below the circular plates and opposing the peripheral edge plate faces of the circular plates, the stators having inclined faces such that the gap between the stators and the plate faces of the circular plates becomes narrower towards the peripheral edge of the plate faces of the circular plates; wherein the plate faces of the circular plates and the inclined faces of the stators form gap portions where particles are held, and wherein the narrowest gap portions between the peripheral edges of the circular plates and the stators form crushing and sizing portions.

In the present invention, the particles fed into the casing fall to the gap portions formed between the respective plate faces of the circular plates and the inclined faces of the stators, and only the particles allowed by the narrowest gap portions to pass through traverse these narrowest gap portions and are discharged downwards. The particles not allowed by the narrowest gap portions to pass through remain in the gap portions and are crushed by the rotation of the circular plates until they attain the target particle size.

Crushing and sizing are carried out specifically by the peripheral edges of the circular plates, in the lower portion thereof, with a view to increasing crushing and sizing efficiency and affording a more compact apparatus.

In the present invention, the stators may have preferably inclined faces opposing the plate faces of the respective neighboring circular plates.

Since both particle holding regions and narrowest gap portions can be formed on both faces of the circular plates, the number of apparatus components in the present invention may be smaller, which redounds to the compactness of the apparatus as a whole.

In the present invention, planar regions parallel to the plate faces of the circular plates may be formed on the peripheral edges of the inclined faces of the stators.

The invention allows thereby forming gaps parallel to the crushing and sizing portions, which enhances particle crushing and sizing taking place in these portions.

In the present invention, cutaway portions may be formed on the peripheral edges of the stators, with adapters provided in the cutaway portions so as to form planar regions parallel to the plate faces of the circular plates.

The invention allows thereby adjusting the gaps of the crushing and sizing portions by adjusting the thickness of the adapters.

In the present invention, the adapters may be provided in the cutaway portions of the stators via interposed spacers.

The invention allows thereby adjusting the gaps of the crushing and sizing portions by arbitrarily modifying the thickness of the spacers.

In the present invention, protrusions may be provided on the opposing faces of the circular plates and the stators that form the crushing and sizing portions.

The invention allows thereby crushing efficiently the materials to be processed, whether dry block materials wholly hard or having a hard core, by the action of the protrusions, thus enhancing the particle crushing and sizing effect in the crushing and sizing portions.

Herein, from the viewpoint of crushing and sizing efficiency, the protrusions provided on the respective opposing faces are preferably arranged so that the protrusions provided on one face may pass between the protrusions provided on the other face.

In the present invention, auxiliary pins may be provided on the plate faces of the circular plates forming the gap portions where the particles are held.

Thus, in the present invention, the auxiliary pins provided on the plate faces of the circular plates expel the particles towards the crushing and sizing portions, preventing thereby the particles from lingering behind and increasing thus processing throughput.

Herein, from the viewpoint of the expelling effect on the particles, the auxiliary pins provided on the plate faces of the circular plates have preferably a substantially triangular shape in a plan view, with one of the triangle's vertices pointing towards the rotation direction of the circular plates.

In the present invention, crushing pins for particle coarse crushing may be provided on the inclined faces of the stators and/or the plate faces of the circular plates.

Thus, even when the particles linger between the plate faces, etc. of the circular plates, the crushing pins of the invention perform a coarse crushing of the particles, thereby supplementing the crushing and sizing action taking place in the crushing and sizing portions, etc.

In the present invention, a fixed shaft may be provided spanning the interior of the casing, such that the stators are fitted to the fixed shaft via spacers, while the circular plates may be supported, via spacers, by the drive shaft.

Thereby, the gaps of the crushing and sizing portions in the present invention can be adjusted by modifying the length of the spacers of the drive shaft and the length of the spacers of the fixed shaft.

In the present invention, a particle feeding inlet may be formed in the upper central portion of the casing, with a particle dispersing means provided between the particle feeding inlet and the circular plates.

Thereby, the particles fed into the casing are distributed uniformly to the gap portions formed between the plate faces of the circular plates and the inclined faces of the stators, which allows increasing the crushing and sizing efficiencies.

In the present invention, the particle dispersing means may be constituted by arranging a cone with its tip pointing upward, in the center of the casing.

In this simple constitution, the particles fed into the casing fall along the inclined surface of the cone and are distributed among the circular plates at positions removed from the casing center, thereby distributing uniformly the particles in the gap portions formed between the plate faces of the circular plates and the inclined faces of the stators.

In the present invention, the particle dispersing means may comprise a plurality of elongated members spanning the casing in the horizontal direction.

In this simple constitution, the particles fed into the casing hit against the elongated members in succession and are dispersed thereby, thus distributing uniformly the particles in the gap portions formed between the plate faces of the circular plates and the inclined faces of the stators.

BEST MODE FOR CARRYING OUT THE INVENTION

The particle crushing and sizing apparatus according to the present invention is described in detail below by way of embodiments, with reference made to relevant accompanying drawings.

Figure 1:
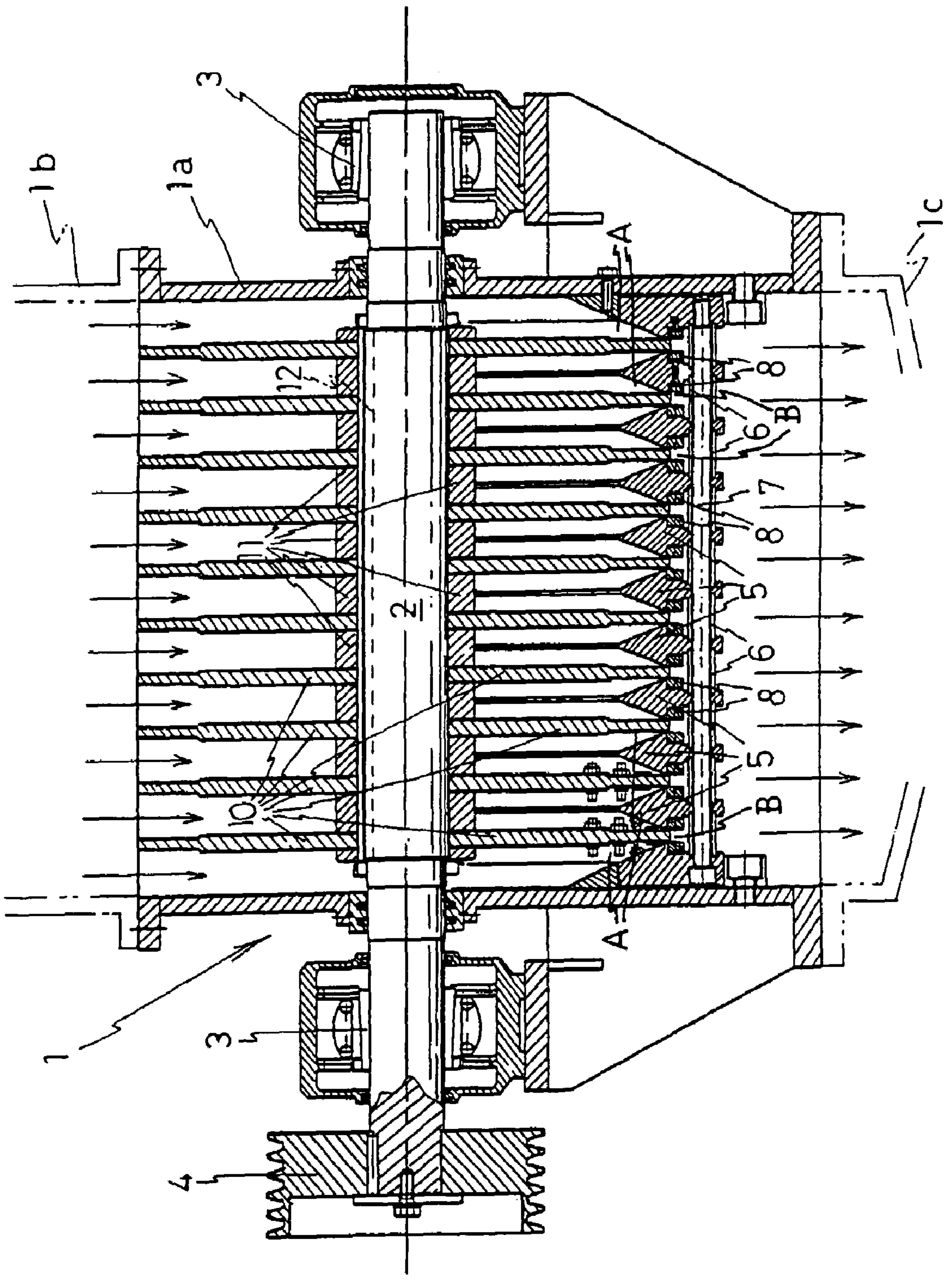
FIG. 1 is a vertical cross-section front view of only the main body of an embodiment of a particle crushing and sizing apparatus according to the present invention.

The particle crushing and sizing apparatus 1 according to the present invention illustrated in FIG. 1 has a rectangular casing body 1*a*. Inside this casing body 1*a* is provided horizontally a drive shaft 2, whose both ends project out of the casing body 1*a* through the side walls thereof. The two ends of the drive shaft 2 are supported by bearings 3, 3. A pulley 4 is provided on one end of the drive shaft 2; the pulley 4 is coupled to a motor pulley via a belt not shown in the figure.

Figure 3:
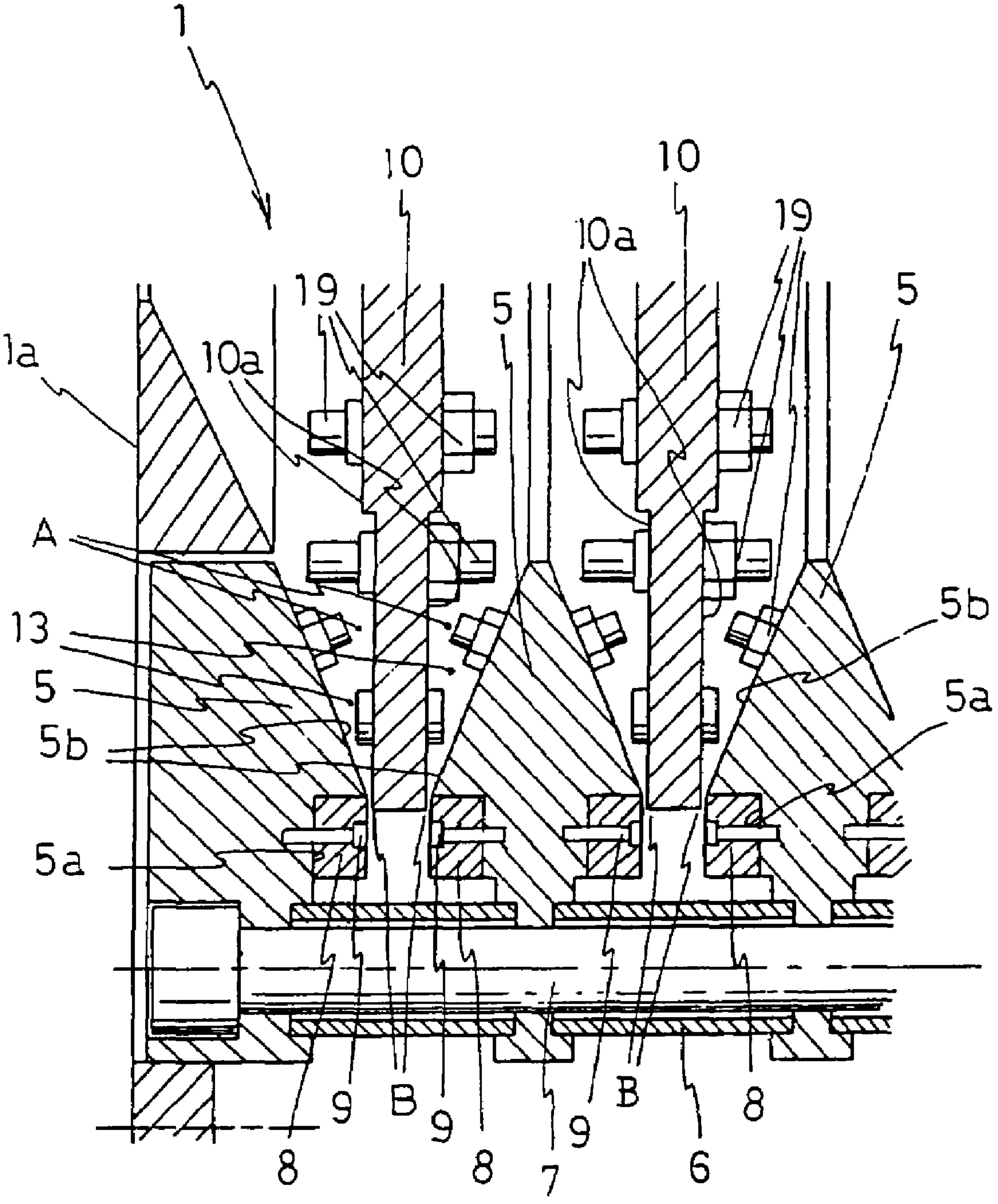
FIG. 3 is an enlarged cross-sectional view of the relevant portion of the particle crushing and sizing apparatus shown in FIG. 1.

Inside the casing body 1*a* are also provided a plurality of stators 5 of semi-circular shape having an isosceles triangle cross-section, the apexes whereof face the drive shaft 2, and through which is inserted a fixed shaft 7 disposed spanning the casing body 1*a*. The stators 5 are equidistantly separated by spacers 6. As shown in FIG. 3, on the peripheral edge of the stators 5 are formed cutaway portions 5*a;* onto the cutaway portions 5*a* are fixed, by way of screws 9, adapters 8 of semi-circular shape having a rectangular cross-section.

Figure 2:
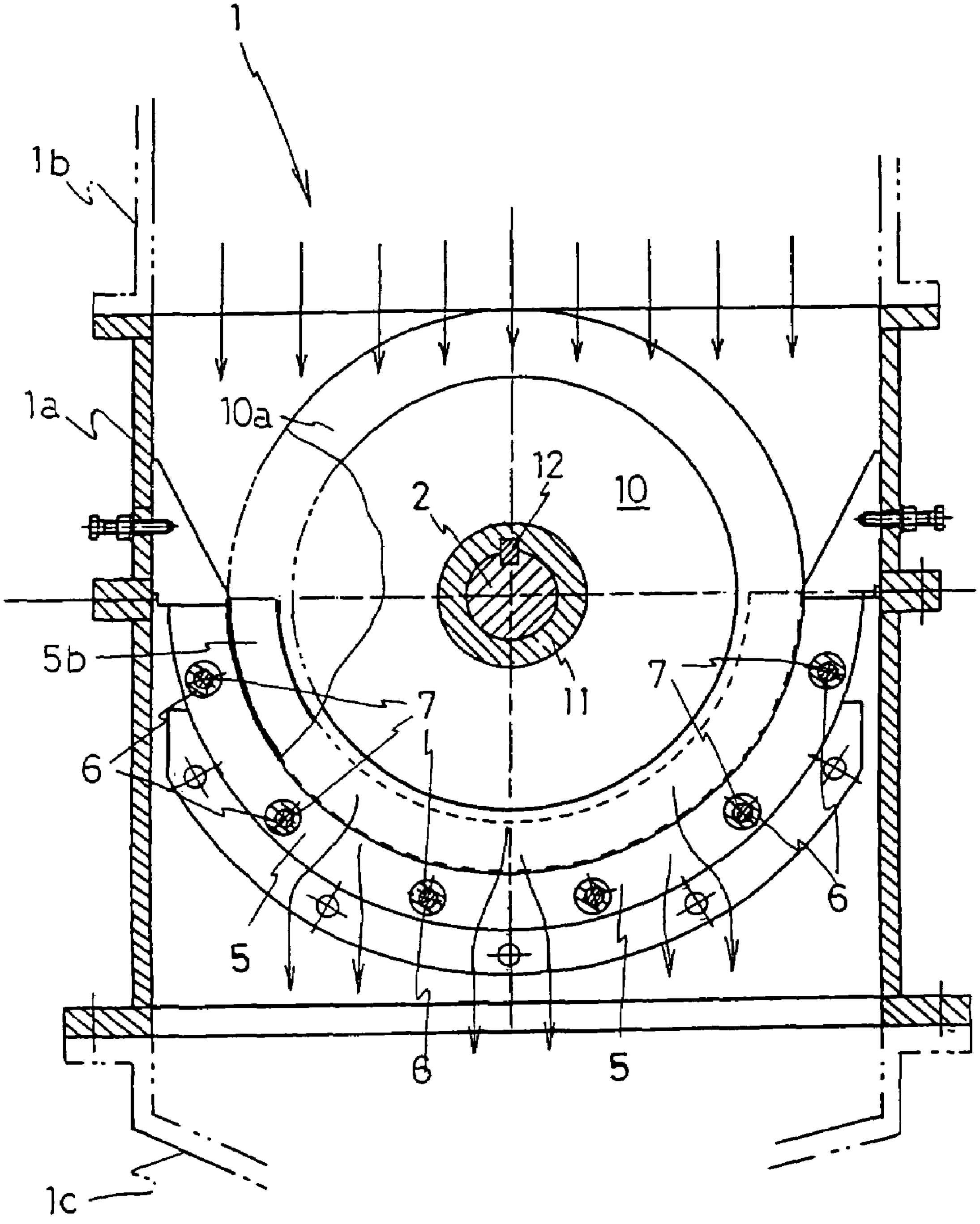
FIG. 2 is a vertical cross-section side view of only the main body of the embodiment of a particle crushing and sizing apparatus of FIG. 1.

Further, as shown in FIG. 1 and FIG. 2, there is provided a plurality of circular plates 10 between the stators 5, 5, supported equidistantly by spacers 11, and fixed by keys 12 to the drive shaft 2.

The particle crushing and sizing apparatus 1 with the above constitution has thus semi-circular stators 5, 5 and adapters 8, 8 arranged on the lower side of the circular plates so as to encompass the peripheral edge of the latter. As shown in FIG. 3, semi-circular hoppers 13 are formed in the lower half of the casing body 1*a* by the peripheral edges of the circular plates 10 and the inclined faces 5*b*, 5*b* of the stators 5, 5. Between the inclined faces 5*b*, 5*b* of the stators 5, 5 and the plate faces 10*a*, 10*a* of the circular plates 10 forming the hoppers 13, are formed gap portions A, A that become gradually narrower towards the peripheral edges of the circular plates 10; between the outermost peripheral edges of the circular plates 10 and the adapters 8, 8 (i.e. in the narrowest portion of the gap portions A, A) are formed particle crushing and sizing portions B, B.

In this particle crushing and sizing apparatus 1, a particle feeding casing 1*b* is connected to the upper portion of the casing body 1*a*, as shown in FIGS. 1 and 2.

Figure 4:
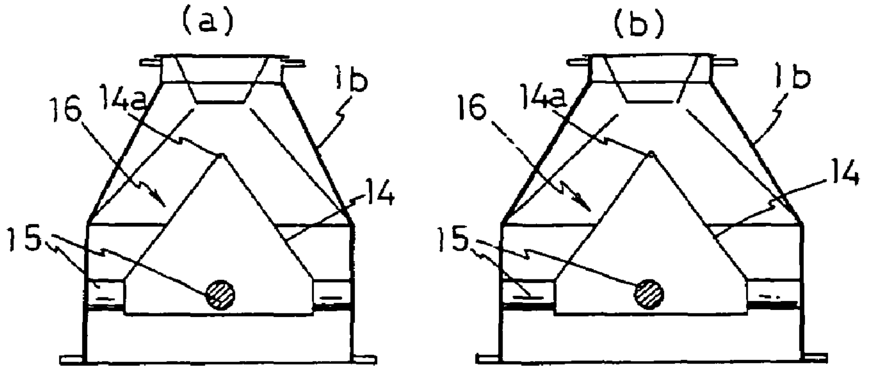
FIG. 4(*a*) is a schematic cross-sectional front view and FIG. 4(*b*) a schematic cross-sectional side view of an embodiment of a particle dispersing means in a particle crushing and sizing apparatus according to the present invention.
Figure 5:
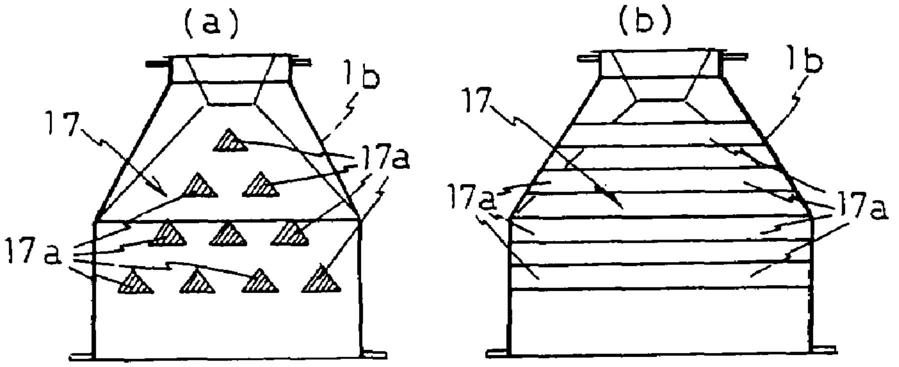
FIG. 5(*a*) is a schematic cross-sectional front view and FIG. 5(*b*) a schematic cross-sectional side view of another embodiment of a particle dispersing means in a particle crushing and sizing apparatus according to the present invention.
Figure 6:
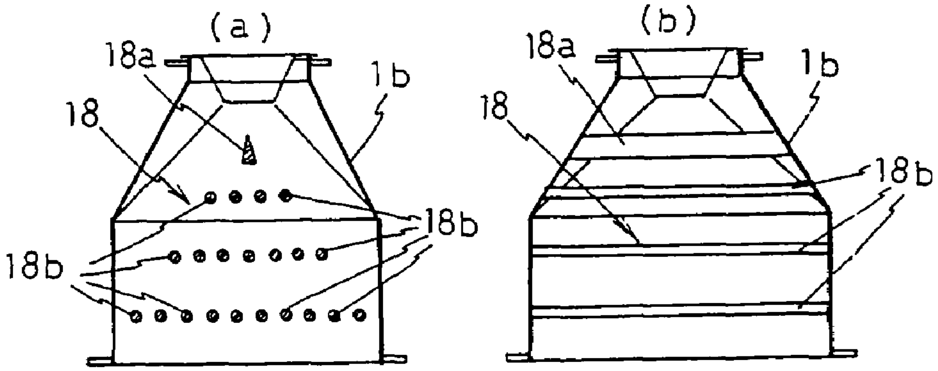
FIG. 6(*a*) is a schematic cross-sectional front view and FIG. 6(*b*) a schematic cross-sectional side view of yet another embodiment of a particle dispersing means in a particle crushing and sizing apparatus according to the present invention.

Inside the particle feeding casing 1*b* there is provided a particle dispersing means, as illustrated in FIGS. 4 through 6, for the required homogenous feeding of particles between the circular plates 10, 10.

In the casing 1*b* shown in FIGS. 4 (*a*) and (*b*) there is provided a particle dispersing means 16 that comprises a conical dispersing member 14 with a tip 14*a* facing upward, and stays 15 across the plane-view center of the casing 1*b*.

In the particle crushing and sizing apparatus 1 having this particle dispersing means 16, the particles fed into the casing 1*b* fall along the inclined surface of the dispersing member 14 and are distributed among the circular plates 10, 10 at positions removed from the casing center, thereby distributing uniformly the particles in the gap portions A formed between the plate faces 10*a* of the circular plates 10 and the inclined faces 5*b* of the stators 5, 5.

In the casing 1*b* illustrated in FIGS. 5(*a*) and 5(*b*), there is provided a dispersing means 17 comprising a plurality (10 in this embodiment) of elongated members 17*a*, having a triangular cross-section, arranged equidistantly forming a triangular array pointing upwards and spanning across mutually opposing side walls of the casing 1*b*.

In the particle crushing and sizing apparatus 1 having this particle dispersing means 17, the particles fed into the casing 1*b* hit against the elongated members 17*a*, 17*a* in succession, and are dispersed thereby, thus distributing uniformly the particles in the gap portions A formed between the plate faces 10*a* of the circular plates 10 and the inclined faces 5*b* of the stators 5.

In the casing 1*b* illustrated in FIGS. 6(*a*) and 6(*b*) there is provided a dispersing means 18 comprising an elongated member 18*a* having a triangular cross-section in an uppermost tier and, below the elongated member 18*a*, a plurality (21 in this embodiment) of elongated members 18*b* having a circular cross-section, disposed in a plurality (3 in this embodiment) of tiers with the number of members per tier increasing towards the bottom; herein, all the above elongated members arranged diametrically across mutually opposing side-walls of the casing 1*b*.

In the particle crushing and sizing apparatus 1 having this particle dispersing means 18, the particles fed into the casing 1*b* hit first the elongated member 18*a* and next the elongated members 18*b* in succession, and are dispersed thereby, thus distributing uniformly the particles in the gap portions A formed between the plate faces 10*a* of the circular plates 10 and the inclined faces 5*b* of the stators 5.

In the particle crushing and sizing apparatus 1 with the above constitutions, a motor etc. rotates the drive shaft 2, which in turn rotates the circular plates 10 fixed thereto. Thus, particles such as wet aggregates, dry block materials, etc. granulated or formed by various apparatuses are fed through the particle feeding casing 1*b*.

The fed particles are first dispersed by the particle dispersing means 16, 17 or 18 provided in the particle feeding casing 1*b*, and are homogeneously distributed thereby between the circular plates 10, 10.

The distributed particles fall between the circular plates 10, 10 into the gap portions A, where particles smaller than a predetermined size travel on along the crushing and sizing portions B and are discharged through a particle discharge casing 1*c*. Particles larger than a predetermined size remain in the gap portions A and, by the rotation of the circular plates 10, are crushed between the plate faces 10*a* of the circular plates 10 and the inclined faces 5*b* of the stators 5 down to a predetermined size, after which they traverse the crushing and sizing portions B and are discharged through the particle discharge casing 1*c*.

The gaps (narrowest gap portions) in the above crushing and sizing portions B are arbitrarily set in accordance with the targeted maximum particle diameter of the particles to be processed, and their size ranges ordinarily from about 1.5 to 3 times the targeted maximum particle diameter of the particles to be processed.

The gaps (narrowest gap portions) in the above crushing and sizing portions B can be adjusted by varying the thickness of the above adapters 8. Specifically, given a ready-made assortment of adapters, replacing for instance thick adapters 8 by thinner adapters 8 allows the gap of the crushing and sizing portions B to become narrower. Replacing the circular plates 10 with other circular plates having thicker peripheral edges allows also narrowing the gaps of the crushing and sizing portions B. In the above embodiments, the gaps of the crushing and sizing portions B can also be adjusted by modifying the length of the spacers 11 fitted to the drive shaft 2 and of the spacers 6 fitted to the fixed shaft 7. Specifically, replacing the above with shorter spacers 11, 6 allows narrowing the gaps of the crushing and sizing portions B, whereas replacing them with longer spacers 11, 6, conversely, allows widening the gaps of the crushing and sizing portions B.

In the above embodiment, the adapters 8 are mounted on the cutaway portions 5*a* of the stators 5 in a way that the crushing and sizing portions B are formed parallel to the plate faces 10*a* of the circular plates 10; however, the adapters 8 may also be integrated with the stators 5 forming a single unit.

Crushing efficiency can be further increased if a plurality of crushing pins 19 for particle coarse-crushing is provided on the inclined faces 5*b* of the stators 5 and the opposing plate faces 10*a* of the circular plates 10, as shown in FIG. 3.

Also, if the faces of the outermost edges of the circular plates 10 and the opposing faces of the adapters 8 are formed as uneven faces with protrusions, grooves, etc., crushing and sizing ability improves, while particles can be diverted more smoothly towards the discharge side, or, conversely, be confined in the gap portions A, etc., all of which can result in a more precise crushing/sizing.

Embodiments of such a particle crushing and sizing apparatus with protrusions, etc. formed on the faces of the outermost edges of the circular plates 10 and the opposing faces of the adapters 8 are described in detail below with reference to FIGS. 7 through 12.

In FIGS. 7 through 12, reference numerals identical to those of the embodiments above denote identical members.

Figure 7:
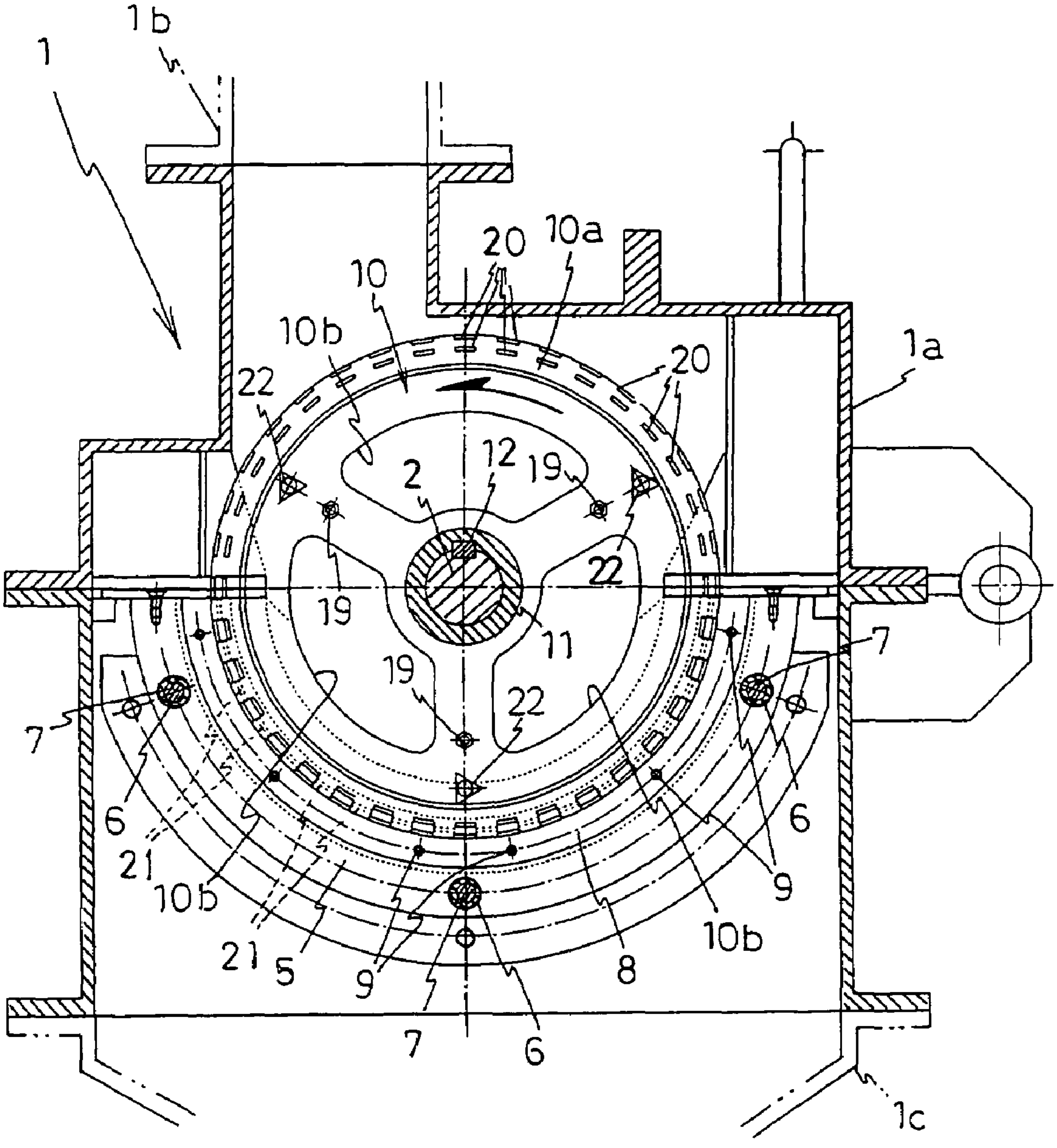
FIG. 7 is a vertical cross-section front view of only the main body of another embodiment of a particle crushing and sizing apparatus according to the present invention.
Figure 8:
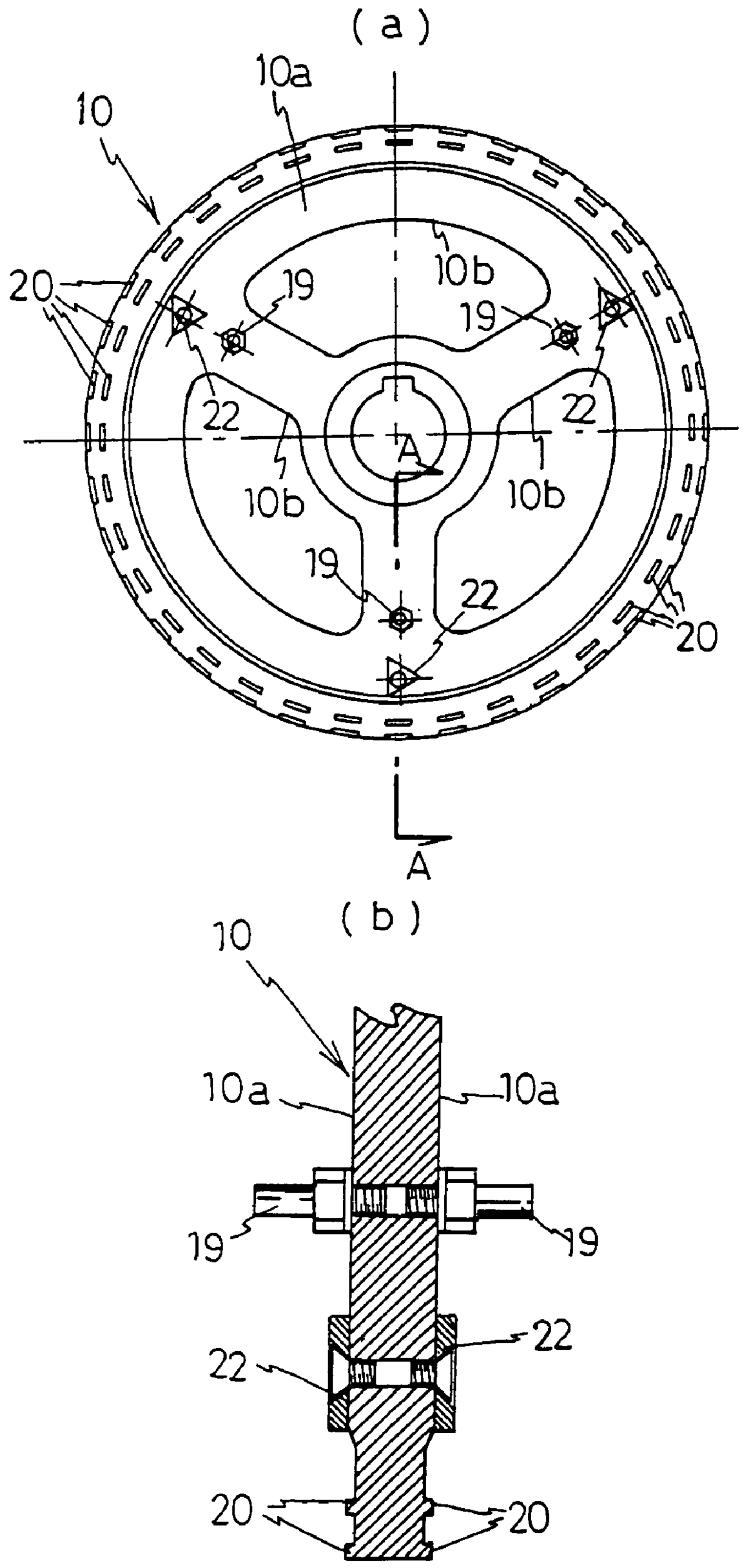
FIG. 8(*a*) is a front view of a circular plate used in the particle crushing and sizing apparatus shown in FIG. 7, and FIG. 8(*b*) is an enlarged view of FIG. 8(*a*) along the line A-A.

In the particle crushing and sizing apparatus 1 according to this embodiment, as illustrated in FIG. 7, there are formed cutouts 10*b* at appropriate locations within the circular plates 10 in order to make the latter lighter. On the outermost peripheral edges of the plate faces of the circular plates 10 are formed a plurality of spike-shaped protrusions 20. As shown in FIG. 8, these spike-shaped protrusions 20 are formed on both outermost edges of the circular plates 10, and are arranged as two rows in the radial direction around the rotation axis, with a predetermined spacing between protrusions both in the radial and the circumferential directions.

Figure 9:
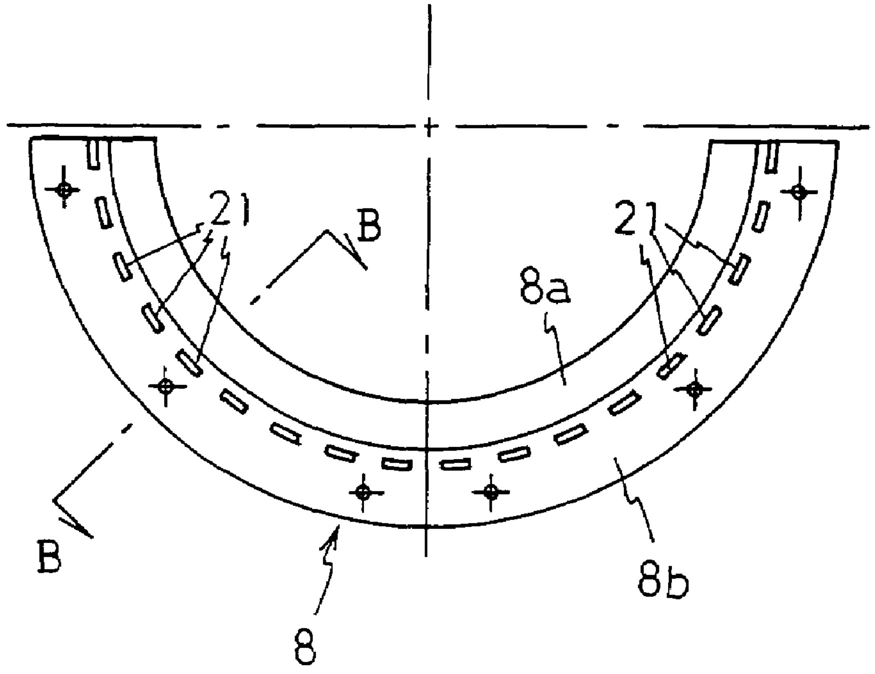
FIG. 9(*a*) is a front view of an adapter used in the particle crushing and sizing apparatus shown in FIG. 7, and FIG. 9(*b*) is an enlarged view of FIG. 9(*a*) along the line B-B.
Figure 9:
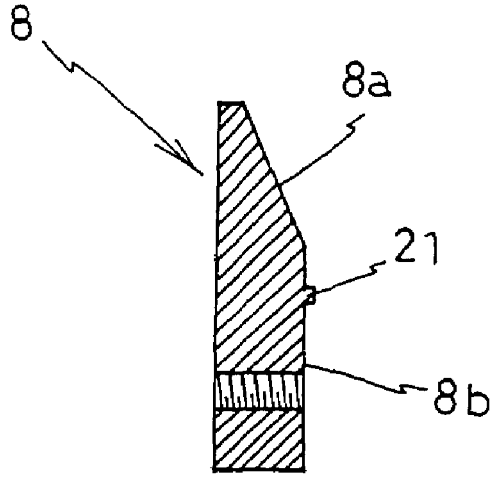
Figure 10:
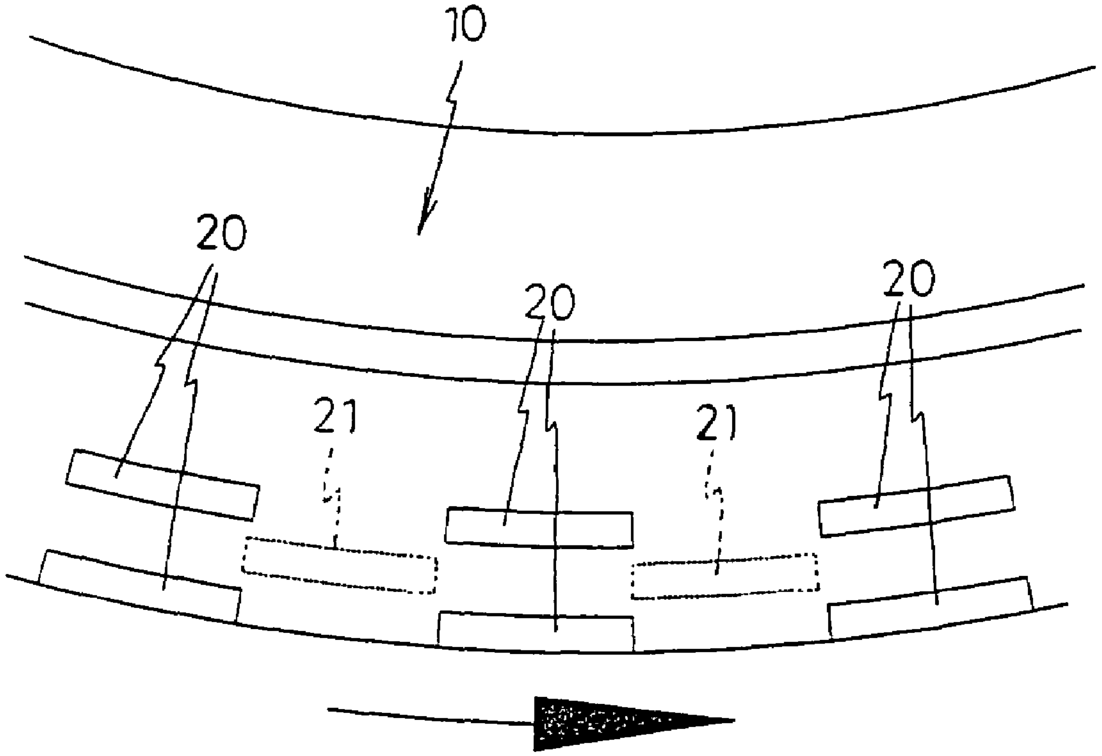
FIG. 10 is a schematic explanatory diagram of the positional relationship of the protrusions depicted in FIGS. 8 and 9.
Figure 11:
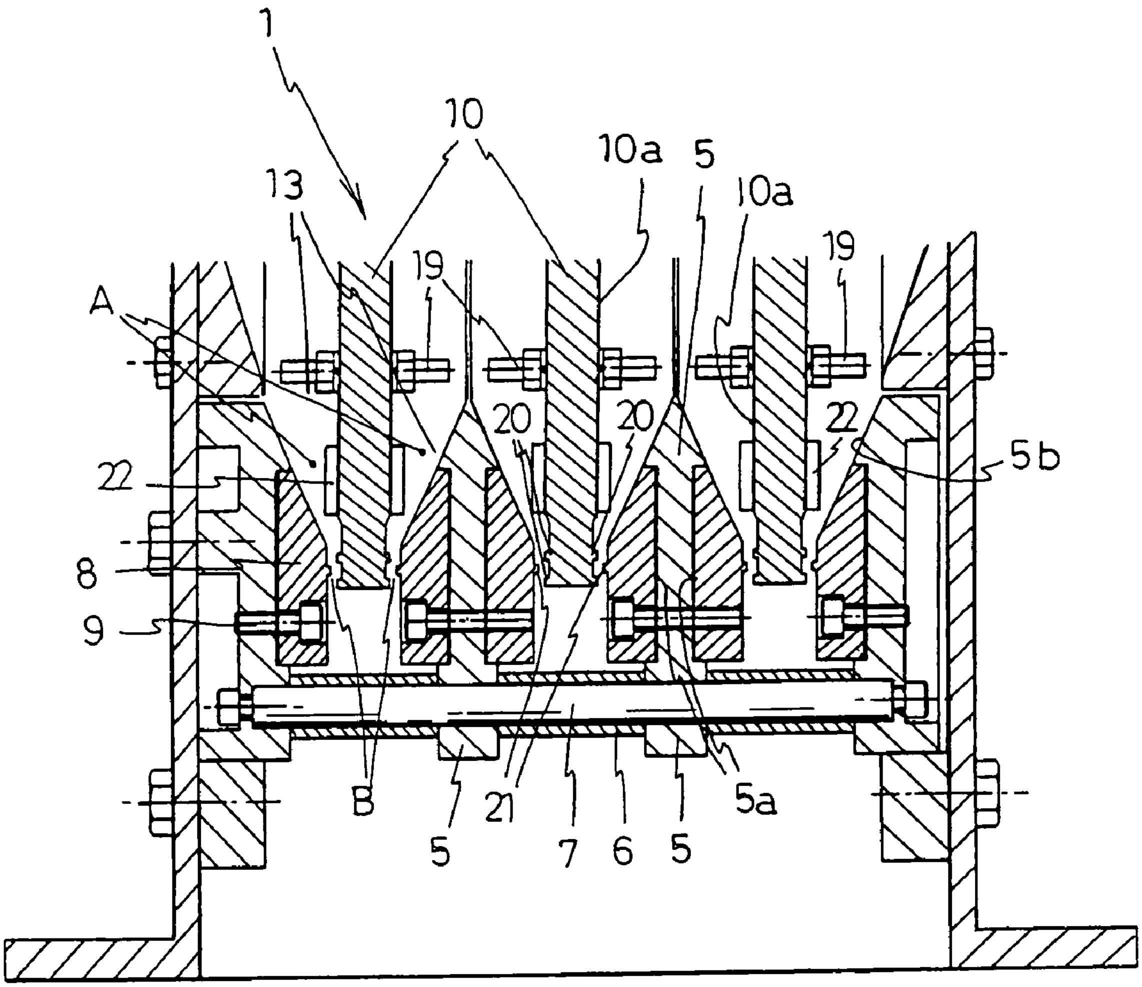
FIG. 11 is an enlarged cross-sectional view of the relevant portion of the particle crushing and sizing apparatus shown in FIG. 7.

On the faces of the adapters 8 that oppose the above plate faces in the outermost peripheral edges of the circular plates 10 is formed also a plurality of spike-shaped protrusions 21. As illustrated in FIG. 9, these spike-shaped protrusions 21 are formed on the vertical faces 8*b* contiguous to the inclined faces 8*a* of the semi-circulate adapters 8, and are arranged as a row along the circumferential direction with a predetermined spacing between protrusions. As shown in FIGS. 7, 10 and 11, the two rows of protrusions 20, 20 formed on the outermost peripheral edges of the plate faces of the circular plates 10 are arranged so as to enclose the protrusions 21 formed on the vertical faces 8*b* of the adapters 8.

The particles, for instance dry block materials wholly hard or having a hard core, that are fed into the particle feeding casing 1*b* and pass through the gap portions A formed between the plate faces 10*a* of the circular plates 10 and the inclined faces 5*b* of the stators 5, to reach the crushing and sizing portions B, are effectively crushed and sized by the protrusions 20, 21 having the above constitution and formed on the opposing faces of the circular plates 10 and the adapters 8 making up the crushing and sizing portions B. The particles are then discharged through the particle discharge casing 1*c*, without lingering in the crushing and sizing portions B.

In particular, a circular plate 10 with a 26 cm diameter has for instance 36 protrusions 20 formed in each row around its outermost peripheral edge, each of the protrusions 20 about 11 mm long in the circumferential direction, 2 mm wide in the radial direction, and 1 mm high, separated from one another by about 11 mm (equivalent to 5 degrees intervals) in the circumferential direction, with neighboring protrusions 20 in the two rows standing 4 mm apart. The two rows of protrusions 20, 20 are arranged at identical locations (in parallel) in the circumferential direction, without position shift.

The dimensions of the above protrusions 21 formed on the opposing faces of the adapters 8 are substantially the same as those of the protrusions 20, although the shape of the protrusions 21, viewed from above, may also be designed so as to block the flow of particles passing between the protrusions 20 and 21 (for instance, a substantially parallelogram shape oblique to a direction obstructing the passage of the particles).

The shape and dimensions of the above protrusions 20, 21, are obviously not limited to those described above, and may be set arbitrarily, so long as the protrusions are provided respectively on the circular plates 10 and the opposing faces of the adapters 8; if, for instance, one of the faces is flat, short pass may occur, which impairs crushing and sizing.

If the protrusions 20, 21 are formed as described above, the narrowest gap in the above crushing and sizing portions B formed between the outermost edges of the circular plates 10 and the opposing faces of the adapters 8 is then the distance between the tips of the protrusions formed on one of the above opposing faces and the other opposing face. This narrowest gap distance can be arbitrarily set as required by the target maximum particle diameter (the average particle diameter depends not only on this narrowest gap distance but also on other factors, such as circular plate rotation speed, amount of particles fed, etc.).

In the present embodiment, in particular, the narrowest gap distance can be adjusted by changing the thickness of the adapters 8 mounted on the cutaway portions 5*a*, leaving the thickness of the circular plates 10 unchanged.

Figure 12:
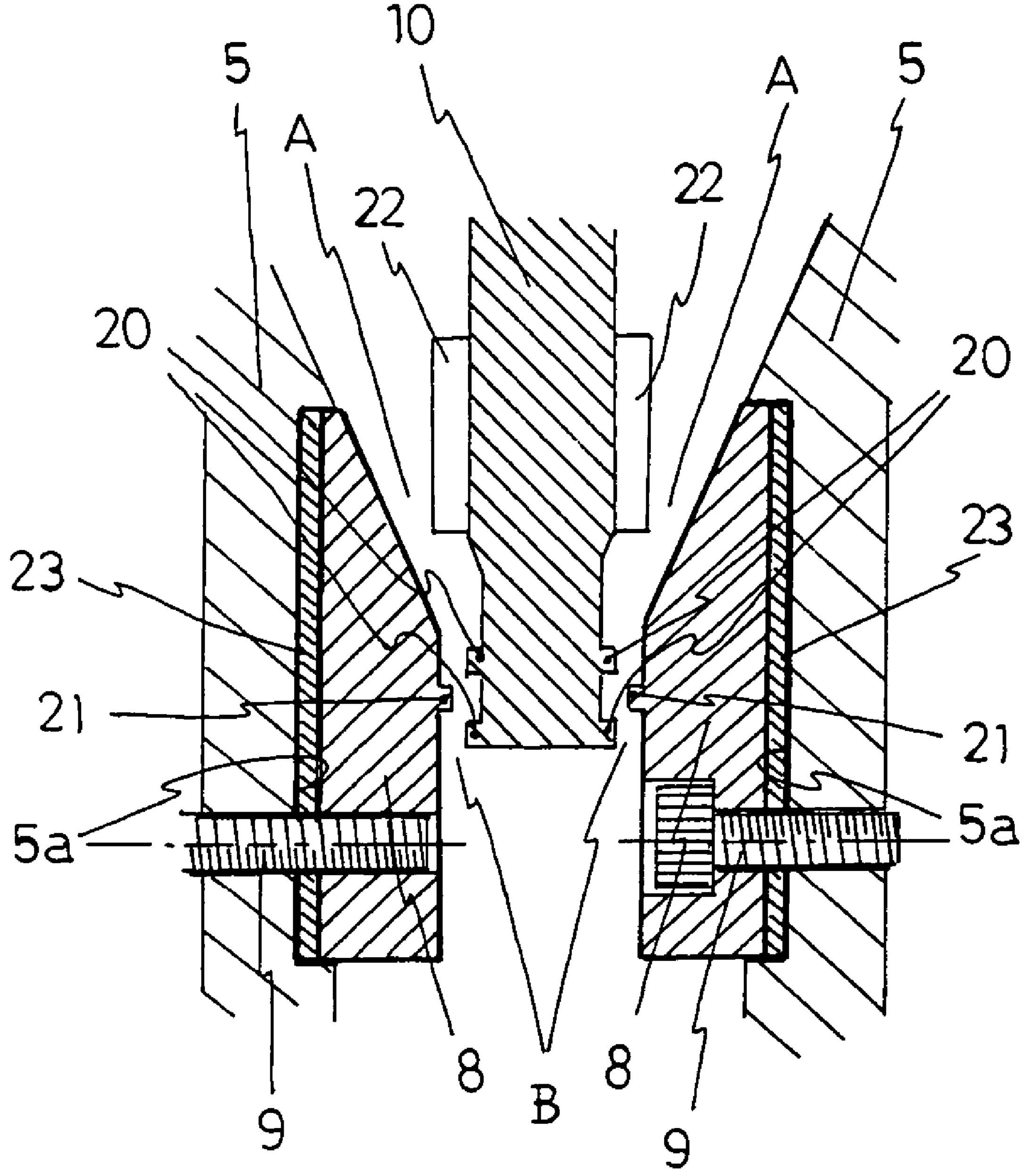
FIG. 12 is an enlarged cross-sectional view of the relevant portion of yet another embodiment of a particle crushing and sizing apparatus according to the present invention.

Also, as shown in FIG. 12, spacers 23 are interposed between the cutaway portions 5*a* of the stators 5 and the adapters 8. The narrowest gap distance can be adjusted as well by changing the thickness of these spacers 23.

However, setting the above narrowest gap distance to 0.5 mm or less is undesirable as it precludes the presence of the protrusions 20, 21 and may also become dangerous when the circular plates 10 rotate at high speeds.

In FIGS. 7 and others, the reference numeral 19 denotes the above-mentioned crushing pins for particle coarse-crushing when, for instance, the fed material is a dry material; as illustrated in FIG. 11, the crushing pins 19 are removably provided at predetermined intervals on the plate faces 10*a* of the circular plates 10 at positions slightly above the gap portions A, the holding regions of the particles.

Specifically, there are three of the above crushing pins 19 mounted on both plate faces 10*a* of the circular plates 10, as illustrated in FIGS. 7 and 8, at 120 degrees in the circumferential direction.

In FIGS. 7 and others, the reference numeral 22 denotes auxiliary pins mounted on both plate faces 10*a* of the circular plates 10 at the positions of the gap portions A, the holding regions of the particles. The function of these auxiliary pins 22 is to expel the particles arriving to the holding regions of the gap portions A, on account of the gravity and the centrifugal force brought about by the rotation of the circular plates 10, quickly towards the crushing and sizing portions B, without lingering in the gap portions A.

The auxiliary pins 22 may have an arbitrary shape, for instance circular, rectangular, triangular, etc. viewed from above, and their mounting angle may also be set arbitrarily so as to ensure the expelling action on the particles. If their shape is triangular as viewed from above, the auxiliary pins 22 are preferably mounted with one of the triangle's vertices towards the rotation direction of the circular plates 10.

In the particle crushing and sizing apparatus 1 according to the present invention having the constitution described above, particles such as wet aggregates, dry block materials, etc. granulated or formed by various apparatuses are fed through the particle feeding casing 1*b*, and with the circular plates 10 rotating, are first coarsely crushed by the crushing pins 19. The centrifugal force resulting from the rotation of the circular plates 10 and the action of the auxiliary pins 22 exert then a pushing force on the particles arriving to the holding regions of the gap portions A that drives them quickly towards the crushing and sizing portions B, without lingering in the gap portions A.

Among the particles pushed into the crushing and sizing portions B, conforming particles are allowed to get through, whereas nonconforming particles, whether dry block materials wholly hard or having a hard core, are effectively crushed and sized by the protrusions 20, 21 provided on the crushing and sizing portions B and, without lingering in the crushing and sizing portions B, are then discharged through the particle discharge casing 1*c*, where they are recovered in a product recovery container not shown in the figures.

While the particle crushing and sizing apparatus according to the present invention has been described by way of the preferred embodiments above, it is to be distinctly understood that the invention is not limited thereto. From the foregoing description, moreover, it will be apparent that various changes may be made without departing from the spirit and scope of the invention as defined in the appended claims.

For instance, in the above embodiments, the particle processing method described focuses on the apparatus according to the present invention used as a single entity; however, the apparatus according to the present invention may be used as a part of a processing plant, with discharge outlets of various types of granulating or forming equipment connected to the particle feeding casing 1*b* of the apparatus according to the present invention, and with feeding inlets of various equipment connected to the discharge casing 1*c* of the apparatus according to the present invention.

INDUSTRIAL APPLICABILITY

The particle crushing and sizing apparatus according to the present invention is a compact and high throughput apparatus that can be optimally used for sizing particles to a predetermined particle size for any kind of wet or dry materials granulated or formed using various equipment, such as drugs, foodstuffs, fodders, chemicals, fertilizers, powdered coal, limestone, ceramics, etc.

The invention claimed is:

1. A particle crushing and sizing apparatus, comprising in a casing: a drive shaft provided horizontally; a plurality of circular plates fixedly supported at intervals by said drive shaft; and stators provided below said circular plates and opposing the peripheral edge plate faces thereof, said stators having inclined faces such that the gap between said stators and the plate faces of said circular plates becomes narrower towards the peripheral edge of the plate faces; wherein the plate faces of said circular plates and the inclined faces of said stators form gap portions where particles are held, and wherein the narrowest gap portions between the peripheral edges of said circular plates and said stators form crushing and sizing portions.

2. A particle crushing and sizing apparatus according to claim 1, wherein said stators comprise inclined faces opposing the plate faces of said respective adjacent circular plates.

3. A particle crushing and sizing apparatus according to claim 1, wherein planar regions parallel to the plate faces of said circular plates are formed on the peripheral edges of the inclined faces of said stators.

4. A particle crushing and sizing apparatus according to claim 3, wherein cutaway portions are formed on the peripheral edges of said stators, with adapters provided in said cutaway portions so as to form planar regions parallel to the plate faces of said circular plates.

5. A particle crushing and sizing apparatus according to claim 4, wherein said adapters are provided in the cutaway portions of said stators via interposed spacers.

6. A particle crushing and sizing apparatus according to claim 1, wherein protrusions are provided on the respective opposing faces of the circular plates and the stators constituting said crushing and sizing portions.

7. A particle crushing and sizing apparatus according to claim 6, wherein the protrusions provided on said respective opposing faces are arranged so that the protrusions provided on one face pass between the protrusions provided on the other face.

8. A particle crushing and sizing apparatus according to claim 1, wherein auxiliary pins are provided on the plate faces of the circular plates forming said gap portions.

9. A particle crushing and sizing apparatus according to claim 8, wherein the auxiliary pins provided on the plate faces of said circular plates have a substantially triangular shape in a plan view with one of the triangle's vertices pointing towards the rotation direction of the circular plates.

10. A particle crushing and sizing apparatus according to claim 1, wherein crushing pins for particle coarse crushing are provided on the inclined faces of said stators and/or the plate faces of said circular plates.

11. A particle crushing and sizing apparatus according to claim 1, wherein a fixed shaft is provided spanning the interior of said casing, such that said stators are fitted onto said fixed shaft via spacers, and said circular plates are supported, via spacers, by said drive shaft.

12. A particle crushing and sizing apparatus according to claim 1, wherein a particle feeding inlet is formed in the upper central portion of said casing, and particle dispersing means is provided between said particle feeding inlet and said circular plates.

13. A particle crushing and sizing apparatus according to claim 12, wherein said particle dispersing means is constituted by arranging a cone with its tip pointing upward, in the center of said casing.

14. A particle crushing and sizing apparatus according to claim 12, wherein said particle dispersing means comprises a plurality of elongated members spanning said casing in the horizontal direction.

* * * * *